United States Patent
Tian et al.

(10) Patent No.: US 9,852,518 B2
(45) Date of Patent: Dec. 26, 2017

(54) METHOD AND SYSTEM FOR CALCULATING LASER BEAM SPOT SIZE

(71) Applicant: SHENZHEN UNIVERSITY, Shenzhen, Guangdong Province (CN)

(72) Inventors: Jindong Tian, Shenzhen (CN); Lei Zhang, Shenzhen (CN); Dong Li, Shenzhen (CN); Yong Tian, Shenzhen (CN)

(73) Assignee: SHENZHEN UNIVERSITY, Shenzhen (CN)

(*) Notice: Subject to any disclaimer, the term of this patent is extended or adjusted under 35 U.S.C. 154(b) by 0 days.

(21) Appl. No.: 15/179,294

(22) Filed: Jun. 10, 2016

(65) Prior Publication Data
US 2016/0364886 A1      Dec. 15, 2016

(30) Foreign Application Priority Data
Jun. 12, 2015     (CN) .......................... 2015 1 0323703

(51) Int. Cl.
*G06K 9/00*     (2006.01)
*G06T 7/60*     (2017.01)
*G06T 5/40*     (2006.01)
*G06T 5/50*     (2006.01)
*G06T 7/62*     (2017.01)

(52) U.S. Cl.
CPC .............. *G06T 7/602* (2013.01); *G06T 5/40* (2013.01); *G06T 5/50* (2013.01); *G06T 7/62* (2017.01); *G06T 2207/20224* (2013.01)

(58) Field of Classification Search
CPC .. G06T 7/602; G06T 7/62; G06T 5/40; G06T 5/50
See application file for complete search history.

(56) References Cited

U.S. PATENT DOCUMENTS

| 4,991,953 A | * | 2/1991 | Pflibsen | ............... | A61B 3/1025 351/205 |
| 2008/0304057 A1 | * | 12/2008 | Bills | ...................... | G01N 21/21 356/237.5 |

\* cited by examiner

*Primary Examiner* — Duy M Dang
(74) *Attorney, Agent, or Firm* — Hauptman Ham, LLP

(57) ABSTRACT

A method and system for calculating laser beam spot size, comprising: collecting a spot image of a laser beam and a corresponding background noise image along an optical axis direction; conducting pretreatment using a background subtraction method and a threshold method according to the spot image and the background noise image collected to obtain a pretreated spot image; calculating the central position of a laser spot of the pretreated spot image; and storing the pixel gray values of the spot image at the central position of the laser spot on a horizontal direction and a vertical direction, then conducting Gaussian curve fitting, calculating variances of Gaussian fitted curves on the horizontal direction and the vertical direction, and obtaining the spot radiuses of the spot image on the horizontal direction and the vertical direction according to the variances calculated.

7 Claims, 6 Drawing Sheets

METHOD AND SYSTEM FOR CALCULATING LASER BEAM SPOT SIZE

FIELD OF THE INVENTION

The present invention belongs to the field of optical information acquisition and process, and particularly relates to a method and system for calculating laser beam spot size.

BACKGROUND OF THE INVENTION

With the continuous development of science and technology, a laser technique has been widely applied to such fields as laser manufacturing, micro machining, laser guidance, optical storage, laser medicine, etc. During the practical application process of laser, light beam quality means to evaluate the laser on the aspect of quality, which has significant meaning on designing, manufacturing, detecting and applying the laser, etc. There have been multiple index parameters for evaluating the laser beam quality at present. Different light beam quality definitions correspond to different application objects, which also reflect different emphasis points of the light beam quality. Therefore, the light beam quality shall be evaluated according to the specific application object.

In addition, the laser spot size, beam waist size, energy distribution, phase distribution, and angle of divergence are also important parameters for measuring the performances of an optical maser. During the practical application of laser, the requirements on the spot quality formed by an optical system are higher and higher. The measurement and analysis of the laser spot are very important to evaluate the imaging quality of the optical system and the stability of the laser beam, and the like; therefore, it is necessary to conduct accurate measurement and analysis on laser beam spots.

Common methods for measuring the laser beam spot sizes include an over-coring method, a knife-edge method and a CCD method. The over-coring method means to shade light using a radius-variable round diaphragm, and calculates the laser spot size through calculating percentage ratios of energies shaded and a diaphragm radius. This method needs to align the center of the diaphragm with the center of the spot, which is relatively difficult in actual operation. The knife-edge method employs a measurement method based on total transmittance, wherein a transmittance function thereof is a step function, and allows the distance between two power thresholds during the moving process of the blade to be defined as the spot size by setting a certain power threshold and pushing a blade along a certain direction. This method is simple in principle, but needs a high precision moving device. The method for measuring laser beam spot size based on a CCD camera has such features as high spatial resolution, wide application range, and flexible computational algorithm, and has become a common method for measuring laser beam spot size. The method for measuring laser beam spot size based on a CCD camera includes a $1/e^2$ definition method and a secondary moment definition method based on moment inalterability provided by the International Standard Organization, however both the two methods need to conduct strict decay on incident light intensity, moreover in order to ensure the precision, over-exposure of a collection camera shall be prevented, and spot image grey values shall be controlled in a certain scope, resulting in complicated operation and poor robustness.

SUMMARY OF THE INVENTION

In order to solve the foregoing technical problem, the invention provides a simple method and system for calculating laser beam spot size with high precision and good robustness.

To solve the technical problem thereof, the prevent invention employs a technical solution for a method as follows.

A method for calculating laser beam spot size comprises:

A. collecting a spot image of a laser beam and a corresponding background noise image along an optical axis direction;

B. conducting pretreatment using a background subtraction method and a threshold method according to the spot image and the background noise image collected to obtain a pretreated spot image;

C. calculating the central position of a laser spot of the pretreated spot image; and D. storing the pixel gray values of the spot image at the central position of the laser spot on a horizontal direction and a vertical direction, then conducting Gaussian curve fitting, calculating variances of Gaussian fitted curves on the horizontal direction and the vertical direction, and obtaining the spot radiuses of the spot image on the horizontal direction and the vertical direction according to the variances calculated.

Further, the step A particularly comprises:

building an optical path system, then collecting a spot image $I_1(x,y,z)$ of a laser beam at a point z along an optical axis direction using a camera, and collecting a background noise image $I_2(x,y,z)$ at the point z through the camera after shielding an incident laser beam.

Further, the step B comprises:

B1. subtracting the background noise image $I_2(x,y,z)$ from the spot image $I_1(x,y,z)$ to obtain a spot image $I_0(x,y,z)$ after eliminating the background noise;

B2. selecting a background region according to a resolution of the spot image $I_0(x,y,z)$, and calculating an image pixel grey value mean value $\delta$ in the background region; and B3. setting all the image pixel grey values less than $\delta$ in the spot image as 0, and keeping the pixel grey values at rest positions unchanged to obtain a pretreated spot image $I(x,y,z)$.

Further, the step C particularly comprises:

calculating a central position $(x_c, y_c)$ of a laser spot of the pretreated spot image, with a calculation formula for the central position $(x_c, y_c)$ of the laser spot being:

$$\begin{cases} x_c = \dfrac{\sum\limits_{i=1}^{m}\sum\limits_{j=1}^{n} I(i,j,z)\cdot i}{\sum\limits_{i=1}^{m}\sum\limits_{j=1}^{n} I(i,j,z)} \\ y_c = \dfrac{\sum\limits_{i=1}^{m}\sum\limits_{j=1}^{n} I(i,j,z)\cdot j}{\sum\limits_{i=1}^{m}\sum\limits_{j=1}^{n} I(i,j,z)} \end{cases},$$

wherein m is a column number of the spot image $I(x,y,z)$, n is a line number of the spot image $I(x,y,z)$, a pixel $I(1,1,z)$ at the upper-left corner is an origin of coordinates of the spot image $I(x,y,z)$, and $I(i,j,z)$ represents a pixel grey value in line i and column j in the spot image.

Further, the step D comprises:

D1. calculating the spot image pixel grey values of the central position $(x_c, y_c)$ of the laser spot on the horizontal direction and the vertical direction;

D2. conducting Gaussian curve fitting on the pixel grey value data of the central position $(x_c, y_c)$ of the laser spot on the horizontal direction and the vertical direction, and calculating variances $\sigma_x$ and $\sigma_y$ of Gaussian fitted curves on the horizontal direction and the vertical direction; and D3. obtaining the spot radiuses of the spot image on the horizontal direction and the vertical direction according to the variances calculated, the spot radiuses of the spot image on the horizontal direction and the vertical direction being $\sqrt{2}\sigma_x$ and $\sqrt{2}\sigma_y$ respectively.

The invention also provides a system for calculating laser beam spot size, which comprises:

an image grabbing module for collecting a spot image of a laser beam and a corresponding background noise image along an optical axis direction;

an image pretreating module for conducting pretreatment using a background subtraction method and a threshold method according to the spot image and the background noise image collected to obtain a pretreated spot image; and an image calculating module for calculating the central position of a laser spot of the pretreated spot image, storing the pixel gray values of the spot image at the central position of the laser spot on a horizontal direction and a vertical direction, then conducting Gaussian curve fitting, calculating variances of Gaussian fitted curves on the horizontal direction and the vertical direction, and obtaining the spot radiuses of the spot image on the horizontal direction and the vertical direction according to the variances calculated.

The invention has the advantageous effects that: the central position of the laser spot is firstly calculated according to a pretreatment result, then the spot radius of the laser beam is calculated through conducting Gaussian curve fitting on the central position of the laser spot without needing to firstly aligning the center of the diaphragm with the center of the spot and without needing a high precision moving device either; the method according to the invention is simple in principle and convenient in operation; moreover, the method is not affected by the incident light intensity and the exposure time of the camera, can keep the stability and high precision of the measurement results for spot images having different exposure time, and has better robustness.

BRIEF DESCRIPTION OF THE DRAWINGS

The invention will be further described in details hereinafter with reference to the drawings and embodiments.

DETAILED DESCRIPTION OF THE EMBODIMENTS

Figure 1:
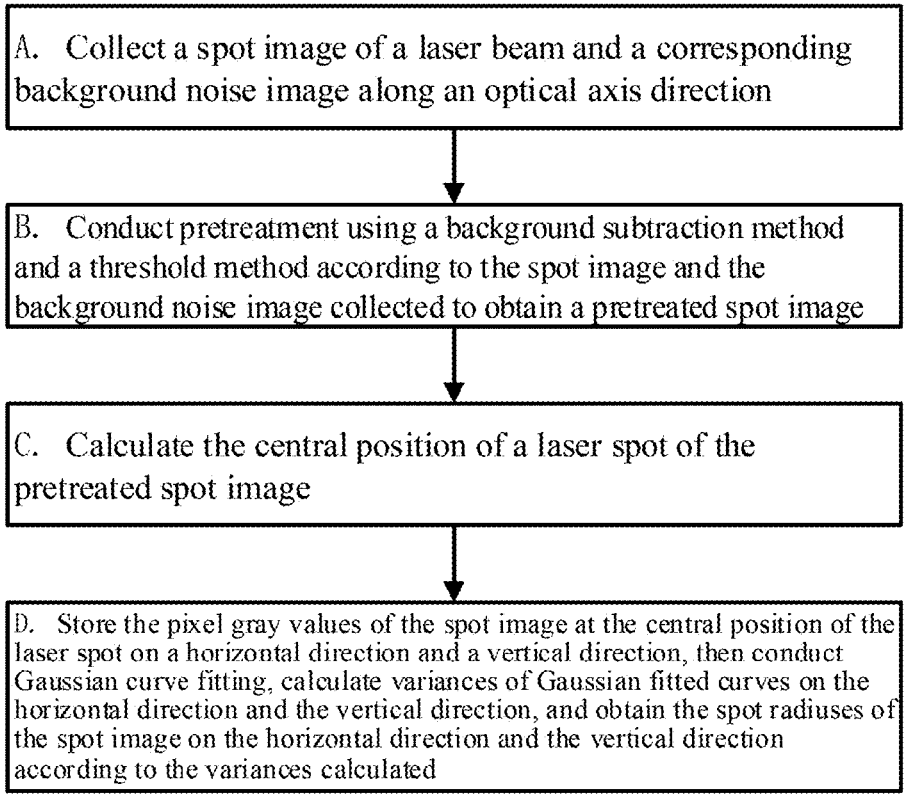
FIG. 1 shows a flow chart of steps of a method for calculating laser beam spot size.

Referring to FIG. 1, a method for calculating laser beam spot size comprises:

A. collecting a spot image of a laser beam and a corresponding background noise image along an optical axis direction;

B. conducting pretreatment using a background subtraction method and a threshold method according to the spot image and the background noise image collected to obtain a pretreated spot image;

C. calculating the central position of a laser spot of the pretreated spot image; and D. storing the pixel gray values of the spot image at the central position of the laser spot on a horizontal direction and a vertical direction, then conducting Gaussian curve fitting, calculating variances of Gaussian fitted curves on the horizontal direction and the vertical direction, and obtaining the spot radiuses of the spot image on the horizontal direction and the vertical direction according to the variances calculated.

As a further preferred implementation manner, the step A particularly includes:

building an optical path system, then collecting a spot image $I_1(x,y,z)$ of a laser beam at a point z along an optical axis direction using a camera, and collecting a background noise image $I_2(x,y,z)$ at the point z through the camera after shielding an incident laser beam.

Figure 2:
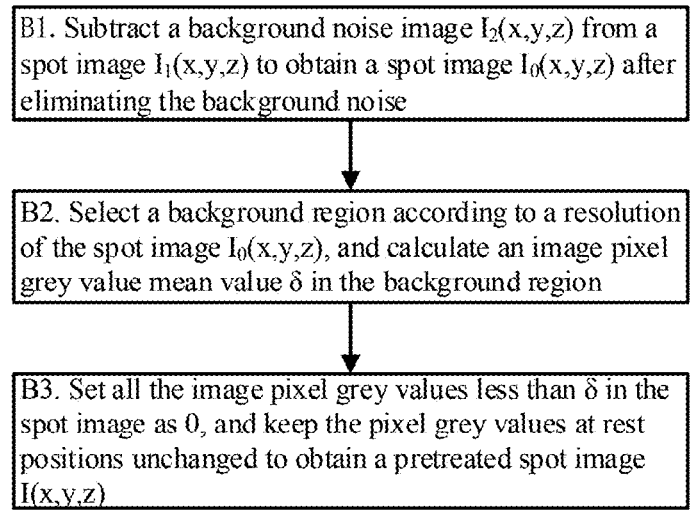
FIG. 2 shows a flow chart of step B of the invention.

Referring to FIG. 2, as a further preferred implementation manner, the step B includes:

B1. subtracting the background noise image $I_2(x,y,z)$ from the spot image $I_1(x,y,z)$ to obtain a spot image $I_0(x,y,z)$ after eliminating the background noise;

B2. selecting a background region according to a resolution of the spot image $I_0(x,y,z)$, and calculating an image pixel grey value mean value $\delta$ in the background region; and B3. setting all the image pixel grey values less than $\delta$ in the spot image as 0, and keeping the pixel grey values at rest positions unchanged to obtain a pretreated spot image $I(x,y,z)$.

As a further preferred implementation manner, the step C particularly includes:

calculating a central position $(x_c, y_c)$ of a laser spot of the pretreated spot image, with a calculation formula for the central position $(x_c, y_c)$ of the laser spot being:

$$\begin{cases} x_c = \dfrac{\sum_{i=1}^{m}\sum_{j=1}^{n} I(i,j,z) \cdot i}{\sum_{i=1}^{m}\sum_{j=1}^{n} I(i,j,z)} \\ y_c = \dfrac{\sum_{i=1}^{m}\sum_{j=1}^{n} I(i,j,z) \cdot j}{\sum_{i=1}^{m}\sum_{j=1}^{n} I(i,j,z)} \end{cases},$$

wherein m is a column number of the spot image $I(x,y,z)$, n is a line number of the spot image $I(x,y,z)$, a pixel $I(1,1,z)$ at the upper-left corner is an origin of coordinates of the spot image I(x,y,z), and I(i,j,z) represents a pixel grey value in line i and column j in the spot image.

Figure 3:
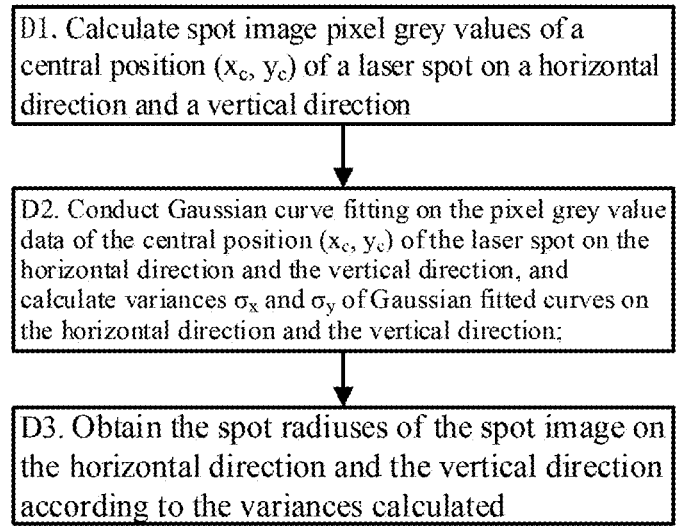
FIG. 3 shows a flow chart of step D of the invention.

Referring to FIG. 3, as a further preferred implementation manner, the step D comprises:

D1. calculating the spot image pixel grey values of the central position $(x_c, y_c)$ of the laser spot on the horizontal direction and the vertical direction;

D2. conducting Gaussian curve fitting on the pixel grey value data of the central position $(x_c, y_c)$ of the laser spot on the horizontal direction and the vertical direction, and calculating variances $\sigma_x$ and $\sigma_y$ of Gaussian fitted curves on the horizontal direction and the vertical direction; and D3. obtaining the spot radiuses of the spot image on the horizontal direction and the vertical direction according to the variances calculated, the spot radiuses of the spot image on the horizontal direction and the vertical direction being $\sqrt{2}\sigma_x$ and $\sqrt{2}\sigma_y$ respectively.

The invention will be further described in details hereinafter with reference to the drawings and specific embodiments.

First Embodiment

Relevant theory and principle of the method for calculating laser beam spot size according to the invention are explained in the embodiment.

Figure 4:
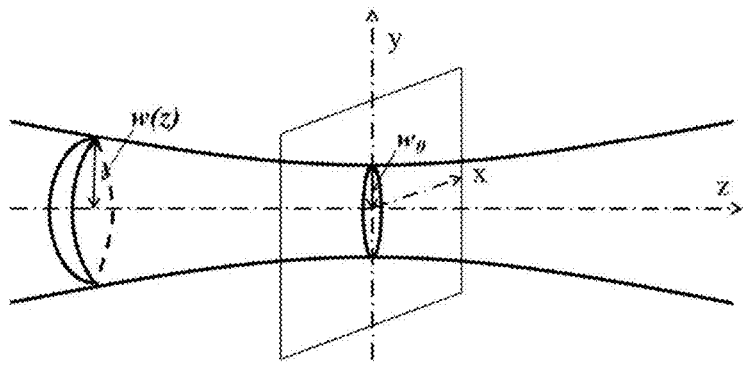
FIG. 4 shows a schematic view of a laser beam spreading along an optical axis direction.

For the laser beam produced in a stable cavity with characters and spreading rules of completely different from that of a common spherical wave or plane wave, all possible types of the laser waveform are referred to as laser beam or Gaussian beam in the disclosure. FIG. 4 shows a schematic view of the laser beam spreading along an optical axis direction; no matter the field is produced by a stable cavity of any structure, the complex amplitude distribution of a field of the Gaussian beam spreading along the z axis direction can be represented in a general form as shown in the following formula (1):

$$E(x, y, z) = \frac{c}{w(z)} e^{-\frac{x^2+y^2}{w^2(z)}} e^{-i\left[k\left(z+\frac{x^2+y^2}{2R(z)}\right)-arctg\frac{z}{f}\right]} \quad (1)$$

In formula (1), x and y belong to a plane-coordinate system of a cross section of the laser beam, z indicates the direction of the laser beam spreading along an optical axis, c is a constant factor, and expressions of other signs are:

$$\begin{cases} k = 2\pi/\lambda \\ w(z) = w_0\sqrt{1+(z/f)^2} \\ R(z) = z + f^2/z \\ f = \pi w_0^2/\lambda \\ w_0 = \sqrt{\lambda f/\pi} \end{cases} \quad (2)$$

wherein $\lambda$ is a wavelength of light, $w_0$ is a waist radius of the Gaussian beam, f is a confocal parameter of the Gaussian beam, R(z) is a radius of curvature of a Gaussian beam quiphase surface intersected with a spreading axis at point z, and w(z) is a spot radius of the Gaussian beam equiphase surface intersected with a spreading axis at point z.

The light intensity U(x,y,z) of the laser beam is in direct proportion to the square of the complex amplitude, i.e.:

$$U(x, y, z) = E(x, y, z) \cdot E^*(x, y, z) = \frac{c^2}{w^2(z)} e^{-\frac{2(x^2+y^2)}{w^2(z)}} \quad (3)$$

wherein E*(x,y,z) represents a conjugate complex function of the complex amplitude of the laser beam.

Further, conducting formal transformation on the formula (3) may obtain:

$$U(x, y, z) = \frac{c^2}{w^2(z)} e^{-\frac{x^2}{\left(\frac{w(z)}{\sqrt{2}}\right)^2}} e^{-\frac{y^2}{\left(\frac{w(z)}{\sqrt{2}}\right)^2}} \quad (4)$$

At this moment, the central position $(x_c, y_c)$ of the laser spot image may be calculated according to a following formula:

$$\begin{cases} x_c = \frac{\sum_{i=1}^{m}\sum_{j=1}^{n} I(i,j,z) \cdot i}{\sum_{i=1}^{m}\sum_{j=1}^{n} I(i,j,z)} \\ y_c = \frac{\sum_{i=1}^{m}\sum_{j=1}^{n} I(i,j,z) \cdot j}{\sum_{i=1}^{m}\sum_{j=1}^{n} I(i,j,z)} \end{cases},$$

wherein, the pixel I(1,1,z) at the upper-left corner of the spot image I(x,y,z) of m (column)×n (line) resolution is defined as an origin of coordinates, and I(i,j,z) represents a pixel grey value in line i and column j in the spot image.

Therefore, for the spot image having a light intensity complying with Gaussian distribution, Gaussian curve fitting may be conducted on the pixel grey pixel gray values at the central position of the spot image on a horizontal direction and a vertical direction, so as to determine variances of Gaussian fitted curves on the two directions, i.e. $\sigma_x$ and $\sigma_y$, and the spot radiuses $w_x(x)$ and $w_y(x)$ of the spot image I(x,y,z) on the horizontal direction and the vertical direction may be respectively obtained with reference to formula (4):

$$\begin{cases} w_x(x) = \sqrt{2}\,\sigma_x \\ w_y(x) = \sqrt{2}\,\sigma_y \end{cases} \quad (5)$$

In a linear system, the grey values of the spot image are linearly increased or decreased; it is knowable from formula (4) that the amplitude of the laser light intensity at this moment changes linearly, and both the mean value and the variances keep stable; therefore, the method of the invention has excellent robustness.

Second Embodiment

The calculation process and calculation results on the ideal laser beam spot sizes are explained in the embodiment.

Figure 5:
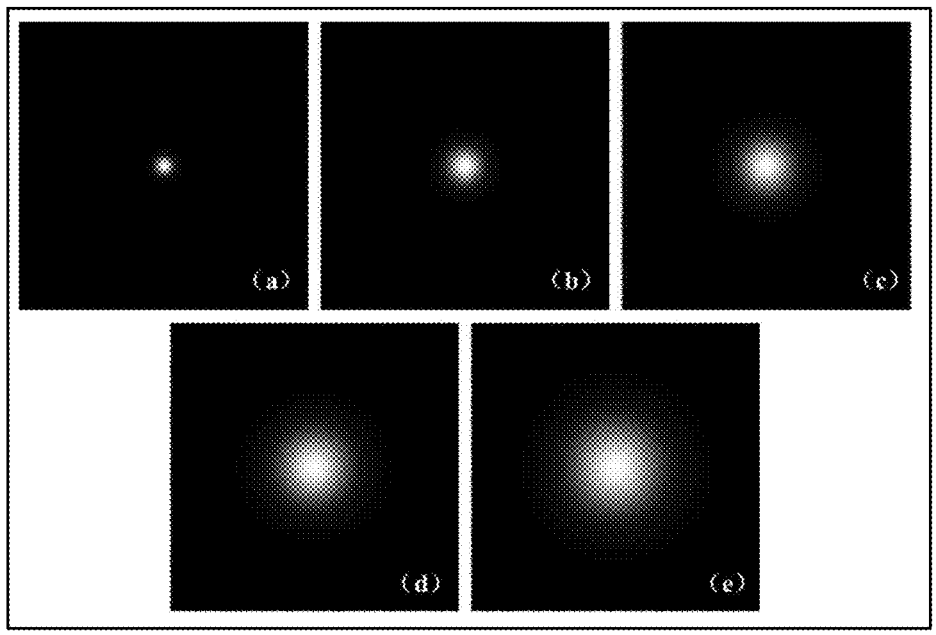
FIG. 5 shows ideal laser beam spot images with different spot sizes.

FIG. 5 shows ideal laser beam spot images with different spot sizes, wherein the image resolutions are all 1025×1025, a central pixel position of the spot is (513, 513), a pixel size is 5.2 μm, and the spot sizes on the horizontal direction and the vertical direction are the same. Theoretical spot radiuses respectively corresponding to FIG. 5(a)-FIG. 5(e) respectively are 0.2 mm, 0.4 mm, 0.6 mm, 0.8 mm, and 1.0 mm in sequence.

Figure 6:
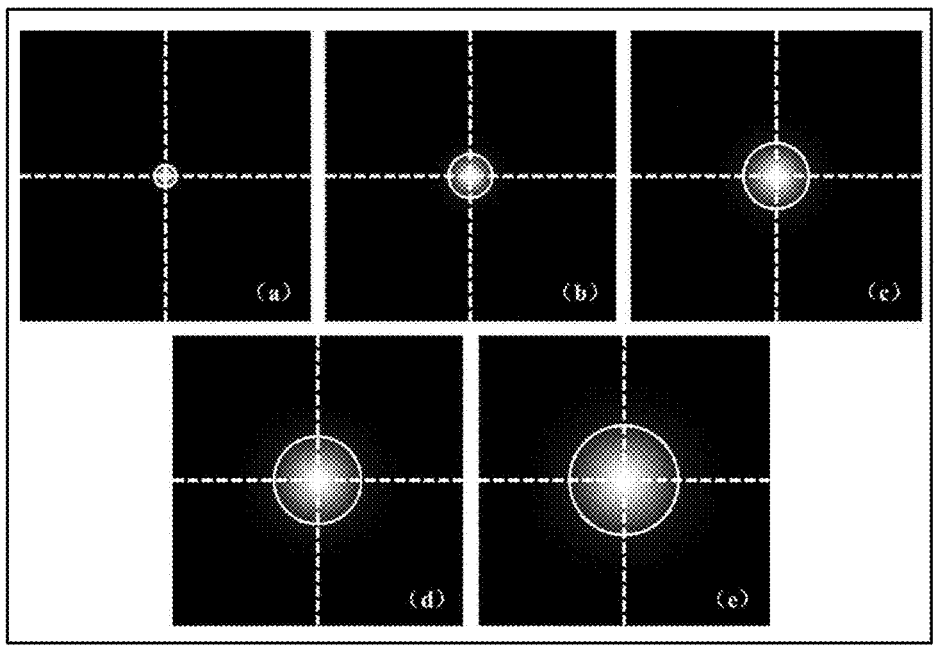
FIG. 6 shows a schematic view of ideal laser beam spot sizes calculated using the method of the invention.

FIG. 6 shows a schematic view of ideal laser beam spot sizes calculated using the method of the invention; a point of intersection of dotted lines on the horizontal direction and the vertical direction represents an ideal laser beam spot center, and a full line represents an ideal laser beam spot size, wherein an actual calculation data sheet is as shown in the following Table 1.

TABLE 1

| Theoretical spot size (mm) | Actually measured central position of the spot on the horizontal direction | Actually measured central position of the spot on the vertical direction | Actually measured spot size on the horizontal direction (mm) | Actually measured spot size on the vertical direction (mm) |
|---|---|---|---|---|
| 0.2 | 513 | 513 | 0.199624 | 0.199624 |
| 0.4 | 513 | 513 | 0.399334 | 0.399334 |
| 0.6 | 513 | 513 | 0.599197 | 0.599197 |
| 0.8 | 513 | 513 | 0.798877 | 0.798877 |
| 1.0 | 513 | 513 | 0.998853 | 0.998853 |

It can be known from the data of Table 1 that a very high precision can be kept between the actually measured laser beam spot size and the theoretical spot size, and an error is less than 0.2%, therefore the method of the invention can be employed to accurately calculate ideal laser beam spot images with different spot sizes.

Figure 7:
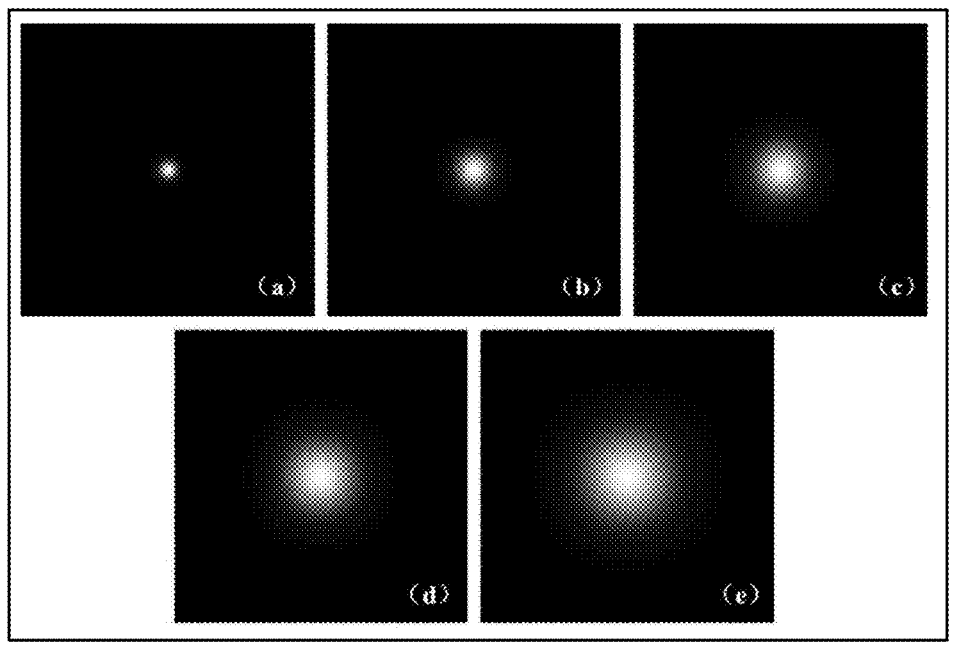
FIG. 7 shows ideal laser beam spot images with different linear transformation coefficients.

FIG. 7 shows ideal laser beam spot images with different linear transformation coefficients. Based on a spot image (i.e., FIG. 6(d)) having a maximum pixel grey value of 255, the theoretical spot radius of the spot image is 1.0 mm, and linear decay and linear enhancement are conducted on the spot image using different linear transformation coefficients. The image resolutions are all 1025×1025, a central pixel position of the spot is (513, 513), a pixel size is 5.2 μm, and the spot sizes on the horizontal direction and the vertical direction are the same. Linear transformation coefficients respectively corresponding to FIG. 7(a)-FIG. 7(e) are 0.4, 0.6, 0.8, 1.0, 2.0, and 3.0 in sequence.

Figure 8:
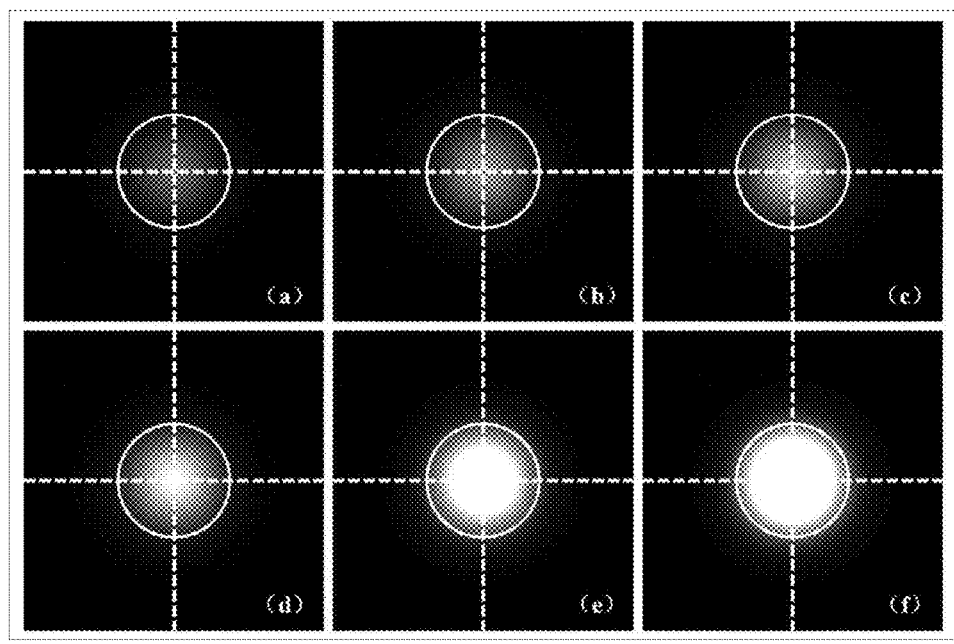
FIG. 8 shows a schematic view of calculating ideal laser beam spot sizes with different linear transformation coefficients using the method of the invention.

FIG. 8 shows a schematic view of ideal laser beam spot sizes with different linear transformation coefficients calculated using the method of the invention; a point of intersection of dotted lines on the horizontal direction and the vertical direction represents a ideal laser beam spot center, and a full line represents an ideal laser beam spot size, wherein an actual calculation data sheet is as shown in the following Table 2.

TABLE 2

| Linear transformation coefficient | Actually measured central position of the spot on the horizontal direction | Actually measured central position of the spot on the vertical direction | Actually measured spot size (mm) on the horizontal direction | Actually measured spot size (mm) on the vertical direction |
|---|---|---|---|---|
| 0.4 | 513 | 513 | 0.998851 | 0.998851 |
| 0.6 | 513 | 513 | 0.998854 | 0.998854 |
| 0.8 | 513 | 513 | 0.998944 | 0.998944 |
| 1.0 | 513 | 513 | 0.998853 | 0.998853 |
| 2.0 | 513 | 513 | 0.999048 | 0.999048 |
| 3.0 | 513 | 513 | 0.998996 | 0.998996 |

It can be known from the data of Table 2 that a very high precision can be kept between the actually measured laser beam spot size and the theoretical spot size under different linear transformation coefficients, and an error is less than 0.12%, i.e., employing the method of the invention has better robustness corresponding to different linear transformation coefficients.

Third Embodiment

A calculation process and calculation results on the laser beam spot image with different exposure time are explained in the embodiment.

Figure 9:
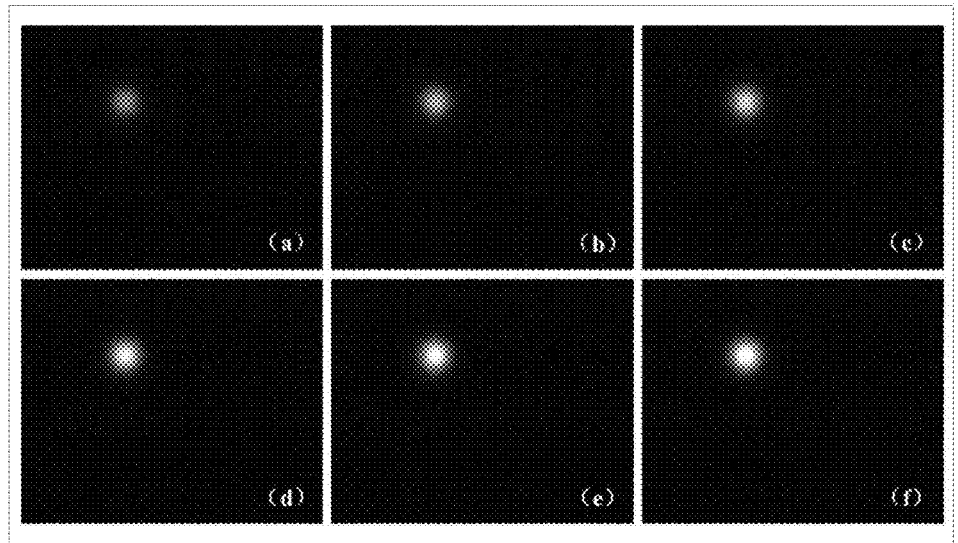
FIG. 9 shows actual laser beam spot images with different exposure time.

FIG. 9 shows actual laser beam spot images with different exposure time. The exposure time of an industrial camera is adjusted, and spot images are collected at a certain position; the image resolutions are all set as 1280×1024, a pixel size is 5.2 μm, and exposure time respectively corresponding to FIG. 9(a)-FIG. 9(f) is 130 ms, 170 ms, 210 ms, 250 ms, 270 ms, and 290 ms in sequence.

Figure 10:
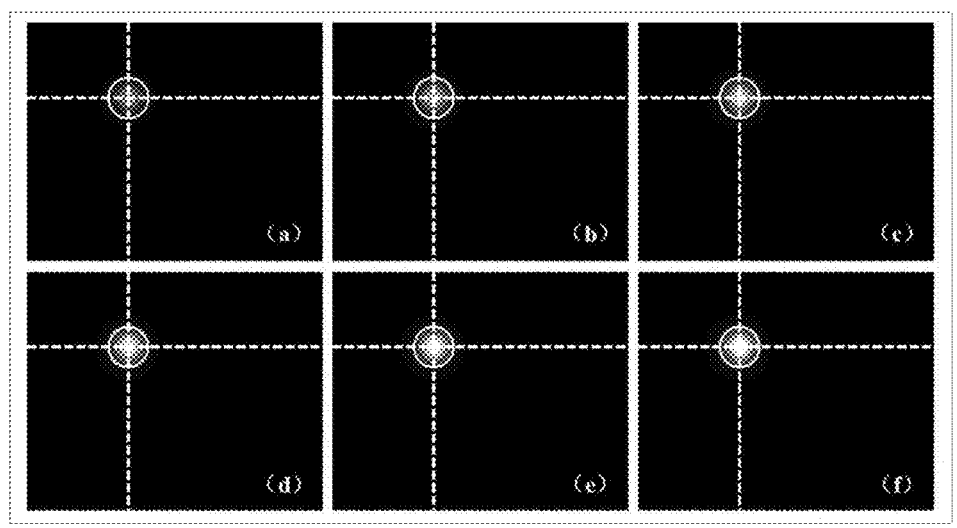
FIG. 10 shows a schematic view of calculating actual laser beam spot sizes with different exposure time using the method of the invention.

As shown in FIG. 10, the method of the invention is employed to calculate actual laser beam spot sizes under different exposure time, wherein a point of intersection of dotted lines on the horizontal direction and the vertical direction represent an actual beam spot center, and a full time represents an actual laser beam spot size; when the exposure time is 250 ms, the pixel grey value of the spot image reaches a saturation state. An actual calculation sheet is as shown in the following Table 3.

TABLE 3

| Exposure time of the industrial camera (ms) | Actually measured central position of the spot on the horizontal direction | Actually measured central position of the spot on the vertical direction | Actually measured spot size (mm) on the horizontal direction | Actually measured spot size on the vertical direction (mm) |
|---|---|---|---|---|
| 130 | 439 | 322 | 0.448603 | 0.454651 |
| 170 | 439 | 322 | 0.446138 | 0.451848 |
| 210 | 439 | 322 | 0.440100 | 0.449407 |
| 250 | 439 | 322 | 0.443399 | 0.448499 |
| 270 | 439 | 322 | 0.442751 | 0.448499 |
| 290 | 439 | 322 | 0.443591 | 0.449501 |

Compared with the prior art, the invention has the following advantages that:

(1) the central position of the laser spot is firstly calculated according to a pretreatment result, then the spot radius of the laser beam is calculated through conducting Gaussian curve fitting on the central position of the laser spot without needing to firstly aligning the center of the diaphragm with the center of the spot and without needing a high precision moving device either; the method according to the invention is simple in principle, wide in application range, and convenient in operation; and (2) the invention is not affected by the incident light intensity and the exposure time of the camera, can keep the stability and high precision of the measurement results for spot images having different exposure time, and has good repeatability, better robustness and lower test cost.

Figure 11:
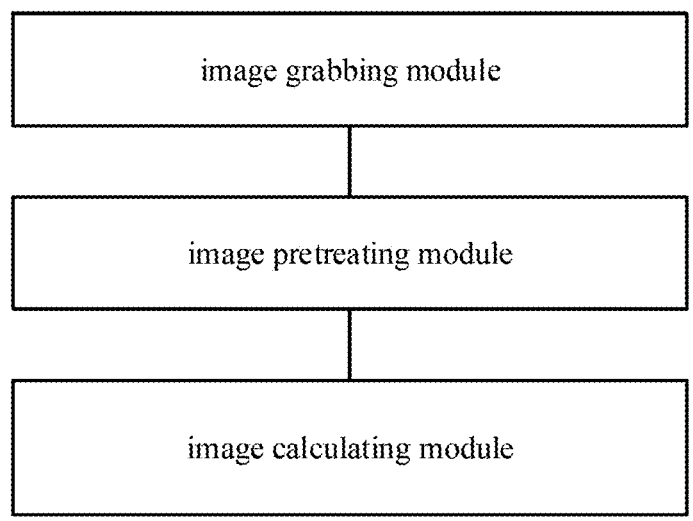
FIG. 11 shows a schematic view of a system for calculating laser beam spot size according to the invention.

As shown in FIG. 11, a system for calculating laser beam spot size according to the invention comprises:

an image grabbing module for performing the abovementioned step A;

an image pretreating module for performing the abovementioned step B; and an image calculating module for performing the abovementioned steps C and D.

The above is specific explanations to the preferred embodiments of the invention, but the invention is not limited to the embodiments. Those skilled in the art may make various equivalent modifications or substitutions without departing from the spirit of the invention, and these equivalent modifications or substitutions shall all fall within the scope defined by the claims of the present application.

The invention claimed is:

1. A method for calculating laser beam spot size, wherein the method comprises:

collecting a spot image of a laser beam and a corresponding background noise image along an optical axis direction;

conducting pretreatment using a background subtraction method and a threshold method according to the spot image and the background noise image collected to obtain a pretreated spot image;

calculating the central position of a laser spot of the pretreated spot image; and storing the pixel gray values of the spot image at the central position of the laser spot on a horizontal direction and a vertical direction, then conducting Gaussian curve fitting, calculating variances of Gaussian fitted curves on the horizontal direction and the vertical direction, and obtaining the spot radiuses of the spot image on the horizontal direction and the vertical direction according to the variances calculated.

2. The method for calculating laser beam spot size according to claim 1, wherein the collecting comprises:

building an optical path system, then collecting a spot image $I_1(x,y,z)$ of a laser beam at a point z along an optical axis direction using a camera, and collecting a background noise image $I_2(x,y,z)$ at the point z through the camera after shielding an incident laser beam.

3. The method for calculating laser beam spot size according to claim 2, wherein the conducting pretreatment comprises:

subtracting the background noise image $I_2(x,y,z)$ from the spot image $I_1(x,y,z)$ to obtain a spot image $I_0(x,y,z)$ after eliminating the background noise;

selecting a background region according to a resolution of the spot image $I_0(x,y,z)$, and calculating an image pixel grey value mean value $\delta$ in the background region; and setting all the image pixel grey values less than $\delta$ in the spot image as 0, and keeping the pixel grey values at rest positions unchanged to obtain a pretreated spot image $I(x,y,z)$.

4. The method for calculating laser beam spot size according to claim 3, wherein:

calculating a central position $(x_c,y_c)$ of a laser spot of the pretreated spot image is performed through the following calculation formula:

$$\begin{cases} x_c = \dfrac{\sum_{i=1}^{m}\sum_{j=1}^{n} I(i,j,z) \cdot i}{\sum_{i=1}^{m}\sum_{j=1}^{n} I(i,j,z)} \\ y_c = \dfrac{\sum_{i=1}^{m}\sum_{j=1}^{n} I(i,j,z) \cdot j}{\sum_{i=1}^{m}\sum_{j=1}^{n} I(i,j,z)} \end{cases},$$

wherein m is a column number of the spot image $I(x,y,z)$, n is a line number of the spot image $I(x,y,z)$, a pixel $I(1,1,z)$ at the upper-left corner is an origin of coordinates of the spot image $I(x,y,z)$, and $I(i,j,z)$ represents a pixel grey value in line i and column j in the spot image.

5. The method for calculating a laser beam spot size according to claim 4, wherein the storing comprises:

calculating the spot image pixel grey values of the central position $(x_c,y_c)$ of the laser spot on the horizontal direction and the vertical direction;

conducting Gaussian curve fitting on the pixel grey value data of the central position $(x_c,y_c)$ of the laser spot on the horizontal direction and the vertical direction, and calculating variances $\sigma_x$ and $\sigma_y$ of Gaussian fitted curves on the horizontal direction and the vertical direction; and obtaining the spot radiuses of the spot image on the horizontal direction and the vertical direction according to the variances calculated, the spot radiuses of the spot image on the horizontal direction and the vertical direction being $\sqrt{2}\sigma_x$ and $\sqrt{2}\sigma_y$ respectively.

6. A system for calculating laser beam spot size, wherein the system comprises:

a camera for collecting a spot image of a laser beam and a corresponding background noise image along an optical axis direction;

an image pretreating module for conducting pretreatment using a background subtraction method and a threshold method according to the spot image and the background noise image collected to obtain a pretreated spot image; and an image calculating module for calculating the central position of a laser spot of the pretreated spot image, storing the pixel gray values of the spot image at the central position of the laser spot on a horizontal direction and a vertical direction, then conducting Gaussian curve fitting, calculating variances of Gaussian fitted curves on the horizontal direction and the vertical direction, and obtaining the spot radiuses of the spot image on the horizontal direction and the vertical direction according to the variances calculated.

7. A method for calculating laser beam spot size, wherein the method comprises:

collecting a spot image of a laser beam and a corresponding background noise image along an optical axis direction;

conducting pretreatment using a background subtraction method and a threshold method according to the spot image and the background noise image collected to obtain a pretreated spot image;

calculating the central position of a laser spot of the pretreated spot image; and storing the pixel gray values of the spot image at the central position of the laser spot on a horizontal direction and a vertical direction, then conducting Gaussian curve fitting, calculating variances of Gaussian fitted curves on the horizontal direction and the vertical direction, and obtaining the spot radiuses of the spot image on the horizontal direction and the vertical direction according to the variances calculated without either first aligning the center of a diaphragm with the center of the spot image or using a high precision moving device.

* * * * *